(12) United States Patent
Churchill et al.

(10) Patent No.: US 7,672,781 B2
(45) Date of Patent: Mar. 2, 2010

(54) MINIATURIZED WIRELESS INERTIAL SENSING SYSTEM

(75) Inventors: David L. Churchill, Burlington, VT (US); Michael John Hamel, Essex Junction, VT (US); Chris Prvyn Townsend, Shelburne, VT (US); Steven W. Arms, Williston, VT (US)

(73) Assignee: Microstrain, Inc., Williston, VT (US)

( * ) Notice: Subject to any disclaimer, the term of this patent is extended or adjusted under 35 U.S.C. 154(b) by 481 days.

(21) Appl. No.: 11/446,637

(22) Filed: Jun. 5, 2006

(65) Prior Publication Data

US 2007/0073482 A1    Mar. 29, 2007

Related U.S. Application Data

(60) Provisional application No. 60/687,005, filed on Jun. 4, 2005.

(51) Int. Cl.
 *G01C 21/00* (2006.01)
(52) U.S. Cl. .......................................... 701/220; 73/488
(58) Field of Classification Search ................ 701/220; 473/151; 73/488; 340/970
 See application file for complete search history.

(56) References Cited

U.S. PATENT DOCUMENTS

| | | | |
|---|---|---|---|
| 4,742,356 A | 5/1988 | Kuipers | |
| 4,776,323 A | 10/1988 | Spector | |
| 5,216,429 A | 6/1993 | Nakagawa | |
| 5,645,077 A | 7/1997 | Foxlin | |
| 5,729,129 A | 3/1998 | Acker | |
| 5,744,953 A | 4/1998 | Hansen | |
| 5,930,741 A | 7/1999 | Kramer | |
| 6,011,526 A | 1/2000 | Toyoshima | |
| 6,162,191 A | 12/2000 | Foxlin | |
| 6,176,837 B1 | 1/2001 | Foxlin | |
| 6,474,159 B1 | 11/2002 | Foxlin | |
| 6,735,524 B1* | 5/2004 | Challoner et al. ........... 701/220 |
| 6,757,068 B2 | 6/2004 | Foxlin | |
| 6,834,436 B2 | 12/2004 | Townsend | |
| 6,871,413 B1 | 3/2005 | Arms | |
| 6,898,492 B2* | 5/2005 | de Leon et al. ............... 701/35 |
| 6,959,259 B2* | 10/2005 | Vock et al. .................. 702/142 |
| 7,081,693 B2 | 7/2006 | Hamel | |
| 7,140,248 B1 | 11/2006 | Brundage | |
| 7,162,392 B2* | 1/2007 | Vock et al. .................. 702/182 |
| 7,366,613 B2* | 4/2008 | DuBois et al. .............. 701/220 |
| 2002/0024450 A1* | 2/2002 | Townsend et al. ....... 340/870.16 |
| 2002/0077189 A1* | 6/2002 | Tuer et al. .................... 473/151 |
| 2003/0120425 A1* | 6/2003 | Stanley et al. ............... 701/220 |
| 2003/0135327 A1* | 7/2003 | Levine et al. ............... 701/220 |
| 2003/0158699 A1 | 8/2003 | Townsend | |

(Continued)

OTHER PUBLICATIONS

Pfau, et al, "A Method for Deriving Displacement Data Durling the Cyclical Movement Using an Inertial Sensor", Journal of Experimental Biology 208, pp. 2503-2514, published by The Company of Biologists 2005.

(Continued)

*Primary Examiner*—Mark Hellner
(74) *Attorney, Agent, or Firm*—James Marc Leas

(57) ABSTRACT

A system includes a moveable body and a first device for mounting on the movable body. The first device includes an orientation sensor, an inertial position sensor, a first processor, a frequency agile RF transceiver, and a memory device.

54 Claims, 12 Drawing Sheets

U.S. PATENT DOCUMENTS

| | | | |
|---|---|---|---|
| 2003/0234730 | A1 | 12/2003 | Arms |
| 2004/0006424 | A1 | 1/2004 | Joyce |
| 2005/0017602 | A1 | 1/2005 | Arms |
| 2005/0210340 | A1 | 9/2005 | Townsend |
| 2005/0256675 | A1 | 11/2005 | Kurata |

OTHER PUBLICATIONS

Churchill, "Quantification of Human Knee Kinematics Using the 3DM-GX1 Sensor", MicroStrain Inc., Jan. 2004, pp. 1-12.

Townsend, et al, "Telemetered Sensors for Dynamic Activity & Structural Performance Monitoring," MicroStrain Inc., International Symposium on Smart Structures & Materials/NDE for Health Monitoring and Diagnostics, 2001.

Arms, et al, "Power Management for Energy Harvesting Wireless Sensors," pp. 1-9, International Symposium on Smart Structures & Materials, San Diego, CA, Mar. 2005.

Arms, et al, "Frequency Agile Wireless Sensor Networks," MicroStrain Inc., SPIE-International Symposium on Smart Structures & Materials/NDE for Health Monitoring and Diagnostics, 2004.

Townsend, Arms, "Wireless Sensor Networks: Principles and Applications," Sensor Technology Handbook, Jon S Wilson, Elsevier Inc., 2005.

Addlesee, et al, "Implementing a Sentient Computing System," Computer Magazine, 0018-9162/01, pp. 50-56, Aug. 2001.

Savage, StrapDown Analytics, StrapDown Associates, Maple Plain, MN, 1997.

Li, et al, "A Low-cost Attitude Heading Reference System by Combination of GPS and Magnetometers and MEMS Inertial Sensors for Mobile Applications," The International Symposium on GPS/GNSS Dec. 8-10, 2005, Hong Kong, paper 5A-01, CD-ROM proceedings.

Grewal, Weill, Andrews, "Global Positioning Systems, Inertial Navigation, and Integration," John Wiley & Sons, Inc. New York, NY, 2001.

Cardarelli, et al, "A MEMS-Integrated Inertial Measurement Unit," Position Location and Navigation Symposium 2002 IEEE, pp. 314-319.

Correal, et al, "An UWB Relative Location System," Proceedings of the IEEE Conference on UWB Systems and Technologies, 394-397 (2003), http://www.ee.vt.edu/~ha/research/uw/sensor_static_location/uwb_relative_location.pdf.

Werb and Lanzl, "Designing a Positioning System for Finding Things and People Indoors," IEEE Spectrum, Sep. 1998, vol. 35, No. 9, pp. 71-78.

Lee and Scholtz, "Ranging in a Dense Multipath Environment Using an UWV Radio Link," Journal on Selected Areas in Communications, vol. 20, No. 9, pp. 1677-1683, Dec. 2002.

Fontana, "UWB Precision Asset Location System," IEEE Conference on UWB Systems and Technologies, May 2002, Baltimore, MD.

Flemming and Kushner, "Low Power, Miniature, Distributed Position Location and Communication Devices Using Ultrawideband Nonsinusoidal Communication Technology," Aetherwire Inc., Semi-Annual Tech Report, ARPA Contract J-FBI-94-058 Jul. 1995.

Patwari, et al, "Relative Location Estimation in Wireless Sensor Networks," IEEE Transactions on Signal Processing, Special Issue on Signal Processing Networks, vol. 51, No. 8, Aug. 2003, pp. 2137-2148.

Software developers kit, http:microstrain.com/sdk/aspx.

Product Literature, "SpaceCom Solutions," Geostat Solutions, Hollywood, FL.

Product Literature, "MTx, 3DOF Orientation Tracker," Xsens Technologies B. V., Enschede, The Netherlands.

Product Literature, "Xbus Master, Portable Multi-Sensor System," Xsens Technologies B.V., Enschede, The Netherlands.

Product Literature, "Wireless Motion Analysis," Corporate Technology Products, Bentley Kinetics Inc., 2006.

Product Literature, "Spider-650," Multipectral Solutions Inc., www.multispectral.com.

Product Literature, "Agile-Link TM, Software Development Kit for 900 MHz Transceivers," MicroStrain Inc., Williston VT, http://www.microstrain.com/agile-link_docs.aspx.

* cited by examiner

MINIATURIZED WIRELESS INERTIAL SENSING SYSTEM

RELATED APPLICATION

This application is a continuation of provisional U.S. patent application 60/687,005, filed Jun. 4, 2005, incorporated herein by reference.

FIELD

This patent application generally relates to sensors. More particularly, it relates to a system for making measurements concerning orientation and movement. It also relates to a system for displaying orientation and displacement.

BACKGROUND

Orientation and/or location tracking have long been important for navigation for shipping, aviation, and unmanned vehicles, manufacturing, warehouse operation, athletic training, physical therapy, animal tracking, computer games, and for such emerging fields as virtual reality and augmented reality. Schemes for measuring orientation and/or position of a moving object have been described in US patents and US patent applications, including U.S. Pat. No. 4,742,356 to Kuipers, U.S. Pat. No. 5,216,429 to Nakagawa, U.S. Pat. No. 5,744,953 to Hansen, U.S. Pat. No. 5,729,129 to Acher, U.S. Pat. No. 5,930,741 to Kramer, U.S. Pat. No. 6,011,526 to Toyoshima, 2003/0135327 to Levine, 2004/0006424 to Joyce, and 2005/0256675 to Kurata, all of which are incorporated herein by reference.

A paper, Correal N., Kyperountas S., Shi Q. and Welborn M., "An UWB Relative Location System" Proceedings of the IEEE Conference on UWB Systems and Technologies, 394-397 (2003), ("the Correal paper"), incorporated herein by reference, provides a review of RF location tracking methodologies, and is available at http://www.ee.vt.edu/~ha/research/uwb/sensor_static_location/uwb_relative_location-.pdf The Correal paper reports an RMS 2-D location error of only 0.16 feet with an RMS error of 0.1 and 0.12 feet in the x and y directions respectively.

Schemes have also been described in papers, all of which are incorporated herein by reference, including:

Werb J. and Lanzl C. "Designing a Positioning System for Finding Things and People indoors", IEEE Spectrum, September 1998, vol. 35, no. 9, pp. 71-78.

Lee J-Y. and Scholtz R. "Ranging in a Dense Multipath Environment Using an UWB Radio Link", Journal on Selected Areas in Communications, vol. 20, no. 9, pp. 1677-1683, December 2002;

Fontana R. "UWB Precision Asset Location System", IEEE Conference on UWB Systems and Technologies, 2002;

R. Flemming and C. Kushner, "Low Power, Miniature, Distributed Position Location and Communication Devices Using Ultrawideband Nonsinusoidal Communication Technology," Aetherwire Inc., Semi-Annual Tech. Rep., ARPA Contract J-FBI-94-058 July 1995;

Patwari N., Hero A., Perkins M., Correal N. and O'Dea B. "Relative Location Estimation in Wireless Sensor Networks," IEEE Transactions on Signal Processing, Special Issue on Signal Processing in Networks, vol. 51, no. 8, August 2003, pp. 2137-2148;

Commercial wireless UWB ranging products are available from Multispectral Solutions, Inc. (Germantown, Md., USA), such as the Spider 650. This manufacturer claims "The Spider-650 is a lightweight, portable RADAR device which utilizes ultra wideband (UWB) short-pulse technology to determine the presence of, and the precise distance to, a target by measuring the roundtrip time-of-flight of the transmitted pulse to the target and back. Spider-650 can accurately determine the range to targets within a 50 foot distance from the unit, with a measurement accuracy of ±1 foot. Spider-650 provides a simple RS-232 or RS-485 interface for external control and monitoring." http://www.multispectral.com/

Electronic sensors have been developed to measure angles between body segments and to measure range of motion of various joints, as described in commonly assigned U.S. patent application Ser. No. 08/990,912 to Arms, ("the '912 patent application"), filed on Dec. 15, 1997, and incorporated herein by reference. The '912 patent application describes a pair of housings that contain a pair of inclinometer board assemblies and the cable and plugs for their connection. The inclinometer board assemblies each include pairs of accelerometers oriented orthogonal to each other, a/d converters, a multiplexer, a voltage regulator, and a microprocessor. The microprocessor computes the angle of each inclinometer housing with respect to the other.

Commonly assigned U.S. patent application Ser. No. 09/457,493 to Arms, ("the '493 patent application"), filed on Dec. 8, 1999, and incorporated herein by reference discloses an inclinometer that includes three orthogonal accelerometers and three orthogonal magnetometers used to measure earth's gravitational and magnetic field vectors from which pitch, roll, and yaw (compass heading) are calculated. Low pass filters are provided to minimize effects due to inertial inputs to the accelerometers that might interfere with accuracy. The '493 application also provides a digital network to allow multiple devices to be wired together on a single bus, a feature useful for applications, such as posture monitoring.

Commonly assigned U.S. patent application Ser. No. 10/082,562 to Arms, ("the '562 patent application"), filed on Feb. 23, 2001, and incorporated herein by reference, describes a posture monitor that can distinguish lying down, sitting, and standing positions.

However, a better system for monitoring orientation and position has been needed that provides improved ability to obtain, process, and communicate such data, and this solution is provided by the following description.

SUMMARY

One aspect of the present patent application is a system, comprising a moveable body and a first device for mounting on the movable body. The first device includes an orientation sensor, an inertial position sensor, a first processor, a frequency agile RF transceiver, and a memory device.

Another aspect is accomplished by a system, comprising a moveable body, a first device, a second device, and a display. The first device is for mounting on the movable body. The first device includes an orientation sensor, an inertial position sensor, a first processor, and a transmitter. The transmitter is for transmitting a first signal. The second device is positioned separate from the moveable body. The second device includes a second processor. The second processor is connected for calculating a second linear position of the moveable body derived from the first signal. The display is in communication with at least one from the group consisting of the first device and the second device for displaying orientation of the moveable body and the second linear position of the moveable body as updated with the inertial position.

BRIEF DESCRIPTION OF THE DRAWINGS

The foregoing will be apparent from the following detailed description, as illustrated in the accompanying drawings, in which:

FIG. 6b is a curve showing the unfiltered FM Doppler signal output of the array of FIG. 6a.

FIG. 6c is a curve showing the low pass filtered Doppler signal output of the array of FIG. 6a.

DETAILED DESCRIPTION

The present applicants recognized that available orientation and position sensing devices could be improved by providing a frequency agile RF transceiver, a processor, and a memory device along with the orientation sensor and inertial position sensor. The frequency agile RF transceiver allows a module to be transmitting on any one of a range of frequencies, which is advantageous for networking such modules, as further described herein below. The inclusion of the receiver in the transceiver allows for communicating to each device on the network, for example for programming each frequency agile transceiver to a particular frequency, or for providing instructions for operating each device. The memory allows for logging data collected by each device for later transmission. Logging data allows for substantially reduced power consumption by a module as compared to it continuously streaming data through its transmitter. The memory also allows for storing instructions transmitted to the device and for reprogramming the processor.

Figure 1A:
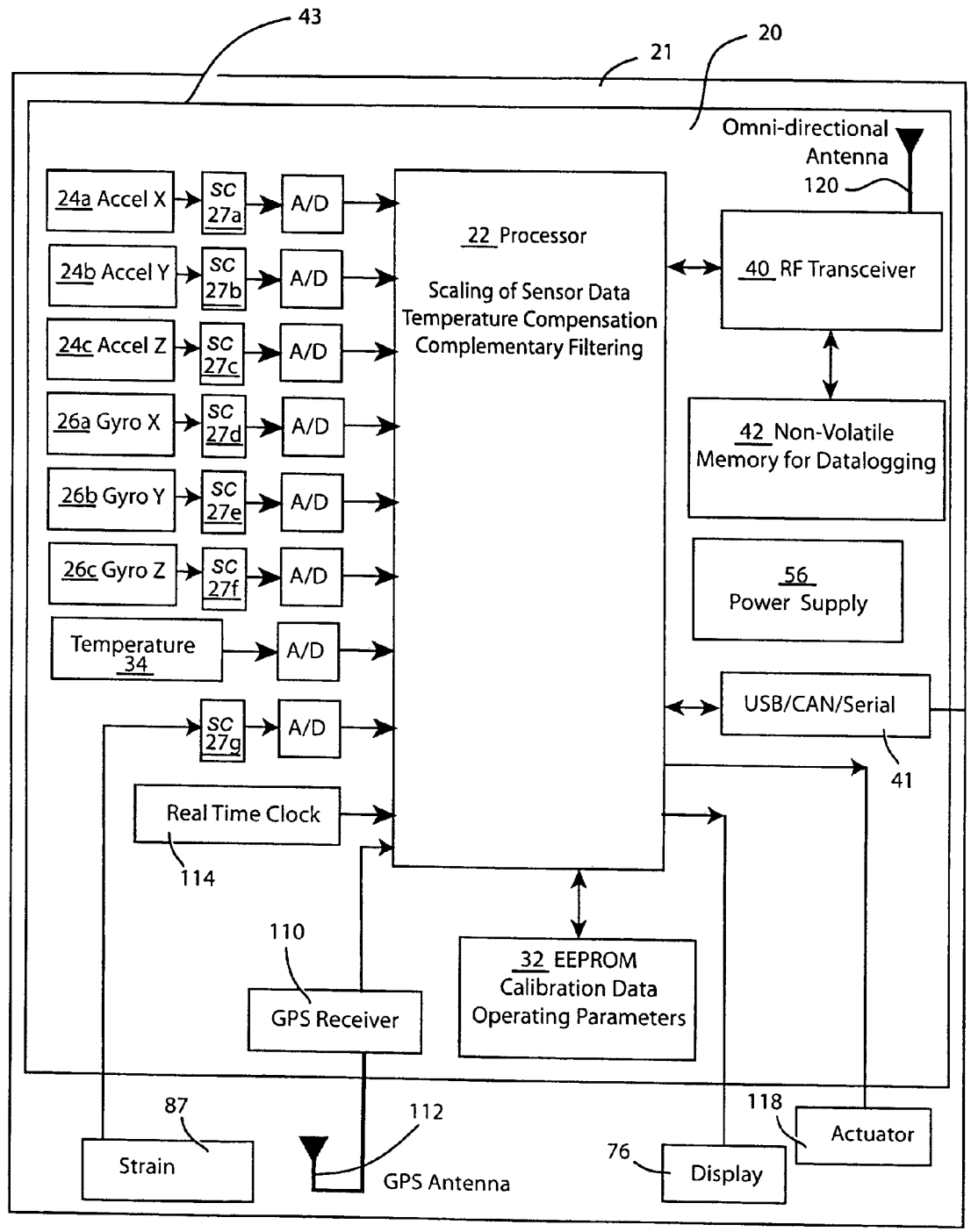
FIG. 1a is a block diagram of a module for mounting on a moveable body including triaxial accelerometer sensors and angular rate sensors, processor, memory, transceiver, temperature sensor, real time clock, and power supply with a strain sensor, actuator, and display connected.
Figure 1B:
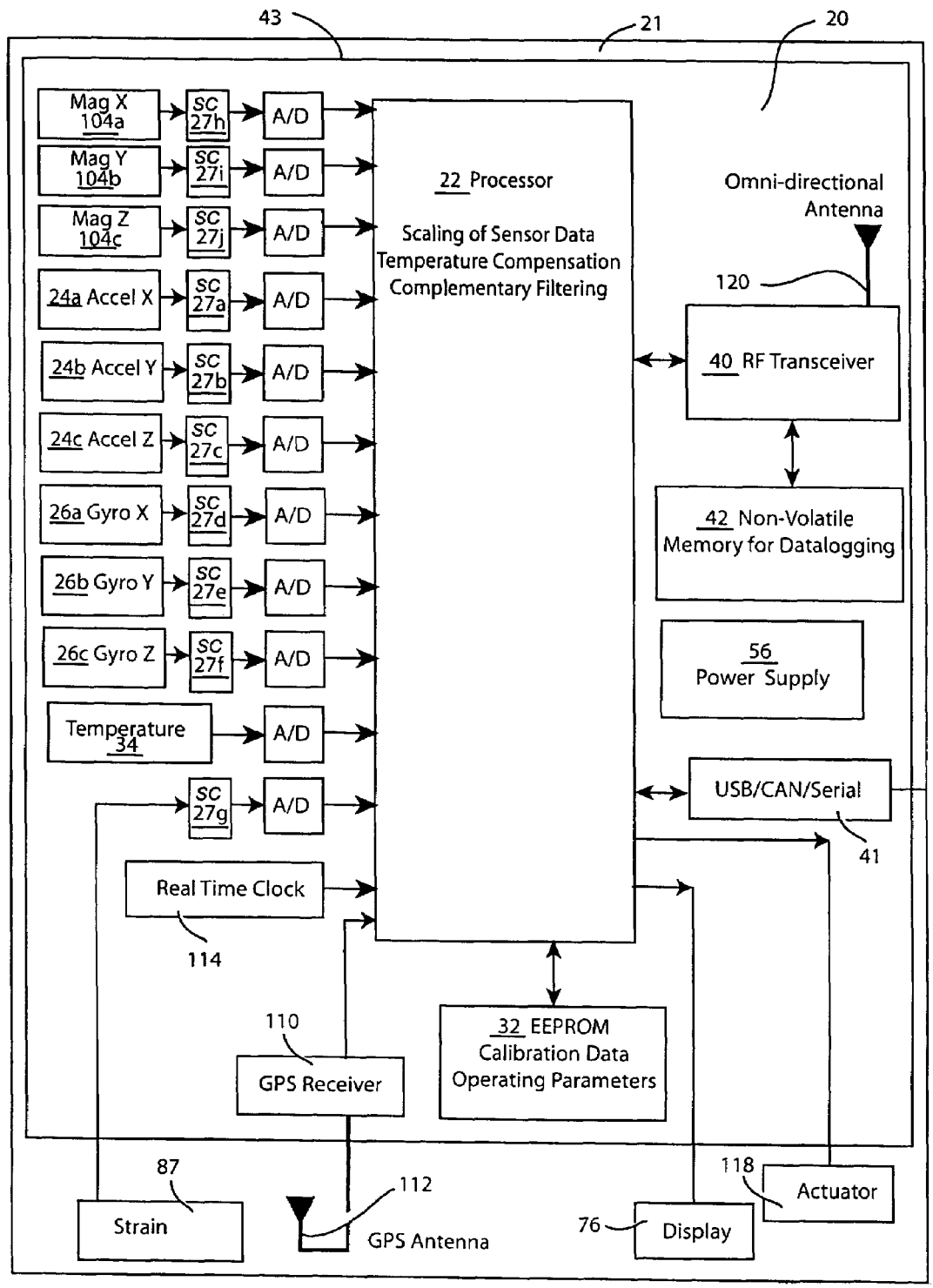
FIG. 1b is a block diagram of a module for mounting on a moveable body similar to that of FIG. 1a, also including triaxial magnetometers.

One such device, called Inertia-Link, available from Microstrain, Inc., Williston Vt., includes sensors that provide orientation and inertial position, signal conditioning, a processor, data logging, wireless bi-directional communications capabilities, and a rechargeable battery power supply, as shown in the block diagram in FIGS. 1a, 1b. The wireless Inertia-Link module is frequency agile, which allows each module to be software programmed on a distinct radio channel. MicroStrain's IEEE802.15.4 wireless system will support 16 distinct channels in the 2.4 GHz band and 26 distinct channels in the 900 MHz band. Each Inertia-Link module includes a unique 16 bit ID code, so over 65,000 wireless modules may be addressed in a network. The unit also includes enough non-volatile memory to store a 96-bit electronic product code EPC for those applications that require standard RFID codes. The memory provided on each module is 2 Mbytes which is enough to log up to about 1 million data points. Much more memory could easily be included.

In operation, module 20 is mounted on moveable body 21. Moveable body 21 can be a camera, an antenna, an oil well drill, a vehicle, an item of sports equipment, a surveying apparatus, a platform, a living being, or any other moveable structure. An item of sports equipment can be a golf club, a racquet, a bat, a lacrosse stick, a hockey stick, a ski, a snow board, a ball, a puck, or an arrow. The living being can be a person or an animal. The vehicle can be an aircraft, a space vehicle, a ground vehicle, or a marine vehicle.

A network of modules 20 can be provided on each moveable body 21. For example, one can be provided above a knee joint and one below the knee joint, similar to those shown in the '912, '493, and '562 patent applications. A network can also include a module 20 on each of many moveable bodies 21. A network can also include more than one module 20 on each of multiple moveable bodies 21. For example, each player on a tennis court can have one module 20 on her racquet and another module 20 on her forearm. The network would therefore include four modules 20 for singles tennis and eight modules 20 for doubles tennis.

Processor 22 in module 20 receives data from accelerometers 24a-24c and angular rate sensors 26a-26c through signal conditioning electronics 27a, 27b, . . . 27g, and A/D converters 28, 30, as shown in FIG. 1a, one signal conditioning electronics and one A/D converter for each sensor. Alternatively, a multiplexer in combination with a single signal conditioning electronics and a single A/D converter can be used. EEPROM 32 provides correction coefficients to processor 22 to correct for any non-orthogonality in positioning of accelerometers 24a-24c and angular rate sensors 26a-26c. EEPROM 32 also provides correction coefficients for temperature as measured by temperature sensor 34. Processor 22 scales raw data from accelerometers 24a-24c and angular rate sensors 26a-26c into physical units and calculates orientation and inertial location. Inertial location is obtained by double integrating acceleration data in processor 22. Orientation information is obtained both from the acceleration measured by accelerometers 24a-24c and from integrating angular rate sensor data in processor 22. Processor 22 can stream data by providing a signal including the orientation and/or position information to transceiver 40. Processor 20 can also log orientation and/or position data in memory 42. A USB, CAN Bus, or serial port 41, such as RS 232 or RS 485 can also be used. These components can all be included in housing 43, as shown in FIGS. 1a, 1b.

Signal conditioning electronics for the sensors includes amplification, anti-aliasing filtering, and may also include programmable offset and programmable gain. For the strain sensor a shunt calibration may also be provided. For the temperature sensor a digital temperature sensor is used that can be directly interfaced to the processor so signal conditioning is not needed. Temperature sensors are usually included with angular rate sensors providing three additional readings that can be used for enhanced temperature compensation of the angular rate sensors.

Figure 2:
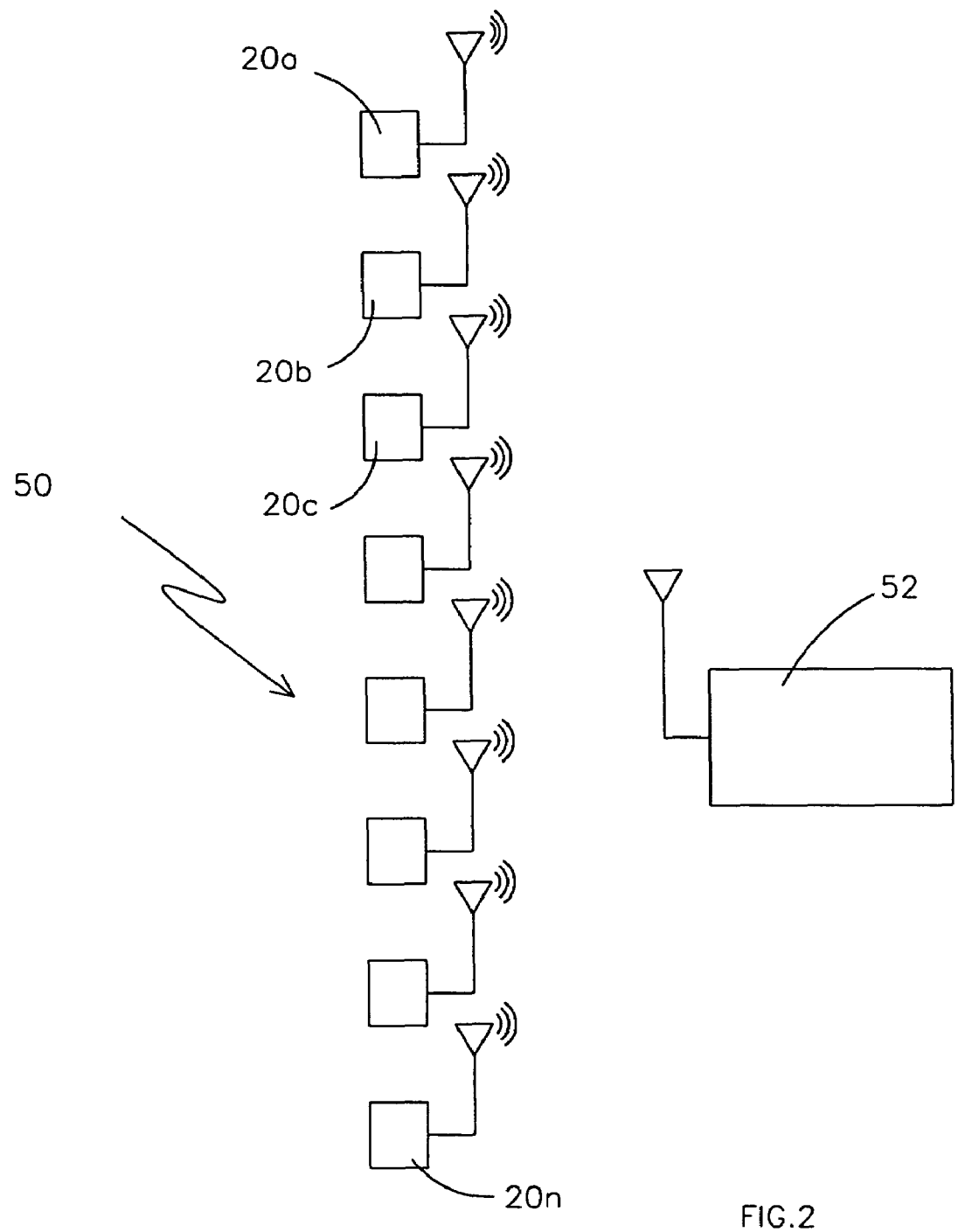
FIG. 2 is a block diagram of a network of modules for mounting on one or more moveable bodies and a base station for receiving their communications and for transmitting instructions.

Modules 20a, 20b, 20c, . . . 20n in network 50 may be controlled by base station 52 to respond to commands, such as commands to control power, communication, data logging, and output modes, as shown in FIG. 2. Base station 52 can communicate bidirectionally with module 20a-20n using a wireless protocol, such as 802.15.4. Base stations of this type are available from Microstrain, Inc., Williston, Vt., and they are known as Agile-Link High Speed Wireless Data Acquisition System. Software, such as the Agile-Link software provided with Inertia-Link modules 20a-20n, can be used for these operations. Using addressing base station 52 may issue commands to a specific module to control that one specific module. Base station 52 may also broadcast commands to all modules 20a-20n in the wireless network. To prevent interference, base station 52 can reprogram each module 20a-20n to transmit on a separate RF channel when multiple modules 20a-20n are streaming data at high rates, for example at over about 500 samples/sec. This technique is called frequency division multiple access (FDMA).

When modules stream at lower rates, for example, below about 500 Hz, base station 52 can program modules 20a-20n to transmit in carrier sense multiple access mode (CSMA) to allow modules 20a-20n to share the same RF channel. With CSMA, modules wait for other modules to stop transmitting before they begin to transmit their data. With CSMA combined with FDMA, many modules can be streaming data in a wireless network. For example, with an update rate of 50 Hz, 10 modules on each RF channel can be included using CSMA. In the 2.4 GHz band, 16 RF channels can be operated simultaneously and transmit periodically at a very good rate. Therefore a total of 16×10=160 wireless modules combining FDMA with CSMA can transmit data to a base station. For two tennis players, each with a module on the tennis racquet and a module on the forearm, four modules need be supported in CSMA mode which can be accomplished on a single RF channel and can provide an update rate of about 125 Hz, which is adequate for gaming and training applications.

High speed digital video, also operating at 125 Hz can be used. Low cost standard digital video, operating at about 30 Hz can also be used, and provided to the USB port of computer 70. Commercially available video capture software can be used to capture video data at the USB port approximately synchronous with data captured from FDMA and CSMA, although there are expected to be quantifyable fixed latency delays.

Commanding the modules to log data, rather than stream continuously, allows even more modules to be included in a network. With a 16 bit ID, over 65,000 modules ($2^{16}$) can log data simultaneously. Transmission of the simultaneously acquired data can then be accomplished later.

Each module on the network needs a power supply, and saving energy is an important factor in operating and maintaining module 20 or each module 20a-20n on network 50. Data logging facilitates that energy savings. Logged data may be compressed prior to transmission to reduce transmission time and thereby reduce the energy consumed from power supply 56, such as a battery, capacitor, or other energy storage element. Power supply 56 can be rechargeable. Connections to power supply 56 to other electronics elements are omitted for clarity.

Energy consumption can also be adjusted by the user since such parameters as sample rates and the time duration for logging or streaming data are software programmable from commands transmitted by base station 52 to transceiver 40 on each module 20.

Energy can also be saved by such methods as programming modules 20 to enter sleep mode between times for logging or streaming data as described in commonly assigned copending U.S. patent application Ser. Nos. 09/731,066 to Townsend, "Data collection and storage device," Ser. No. 10/379,224 to Arms, "Robotic System for Powering and Interrogating Sensors", filed Mar. 5, 2003, and Ser. No. 11/084,541 to Townsend, "Wireless Sensor System," filed Mar. 18, 2005, all of which are incorporated herein by reference. Saved compressed data obtained over a specified time interval and sample rate can be wirelessly transmitted to base station 52 on a single RF channel or over multiple RF channels as described herein above.

Energy harvesting can be used to recharge power supply 56, as described in commonly assigned copending U.S. patent application Ser. Nos. 10/379,223, "Energy Harvesting for Wireless Sensor Operation and Data Transmission," filed Mar. 5, 2003, and Ser. No. 10/769,642, "Shaft Mounted Energy Harvesting for Wireless Sensor Operation and Data Transmission," filed Jan. 30, 2004, both incorporated herein by reference.

Commands available on the Inertia-Link include:
network go to sleep
module(s) go to sleep
network wake up
module(s) wake up
module(s) stream data
trigger network to log data
trigger module(s) to log data
Ping base station
Read base station EEPROM
Write base station EEPROM
Ping node
Read node EEPROM
Write node EEPROM
Download node datalogging page
Erase node datalogging pages Stream network sensor data in FDMA mode
Read node single sensor
Set analog base station
Broadcast to nodes
Cycle power
Set radio frequencies/features The user may also wirelessly program various orientation sensor output modes to describe the orientation of moveable body 21, Euler angles, Orientation matrix, or Quatemion, as described in the paper by David Churchill, "Quantification of Human Knee Kinematics Using the 3DM-GX1 Sensor," published as a white paper by Microstrain, Inc., 2004, ("the Churchill paper") http://microstrain.com/white/Quantification_of_Human_Knee_Kinematics_Using_the_3 DM-GX1_Sensor.pdf. Once the orientation is measured by two modules one either side of a joint, then the angle of the joint can be determined, as described in the Churchill paper, and in the '912, '493, and '562 patent applications. The present system allows determination of all three angles.

Further description of these Agile-Link functions is available as part number 3010-9044 from Microstrain, Inc., Williston, Vt., including a http://microstrain.com/agile-link-demos.aspx and the software developer's kit is available at http://microstrain.com/sdk.aspx, both incorporated herein by reference.

Because the double integration to calculate position is sensitive to slight imperfections in the inertial sensor's performance, the inertial position calculated by dead reckoning is subject to drift error, and this error increases continuously with time. The calculated position could be improved by periodically including position information measured external to moveable body 21. Accelerometer information and angular rate information from module 20 can be combined with position information determined by an external device, as described in the book, *Global Positioning Systems, Inertial Navigation, and Integration*, Grewal M S, Weill L R, Andrews A P, John Wiley & Sons, Inc., New York, N.Y., 2001 and in the book, *StrapDown Analytics*, Savage P, StrapDown Associates, Maple Plain, Minn., 1997, and as shown in the flow chart of the Inertia-Link software of FIG. 3.

Accelerometers 24 provide acceleration data $A^B$ in the coordinate system of body 21 to which they are mounted, including both acceleration due to gravity and accelerations from movement. In most situations $A^B$, or the DC component of $A^B$, provides an approximation of the orientation of the body coordinate frame with respect to the gravity vector, which is expressed in FIG. 3 as $G_a^B$.

A different approximation of the orientation of moveable body 21 in the body coordinate system $G_g^B$ is calculated in processor 22 by integrating the angular velocity as measured by angular rate sensors 26.

Processor 22 is used to transform the body coordinate system value of acceleration vector $A^B$, derived from accelerometers 24, to a fixed coordinate system external to moveable body 21, as shown in box 60. The transformation uses orientation of moveable body 21, as provided by angular rate sensors 26.

The gravity vector is then subtracted in this fixed coordinate system, leaving $A^F$, the acceleration from movement of moveable body 21 in the fixed coordinate system. This value is then double integrated over time to provide position $P_a^F$ which is the position in the fixed coordinate system as determined by dead reckoning from an initial starting position using the measured accelerations from accelerometers 24 and angular rate sensors 26.

While this dead reckoning calculation is very good for short enough time intervals, position determination can be kept accurate indefinitely by periodically including position information measured external to moveable body 21.

Figure 4:
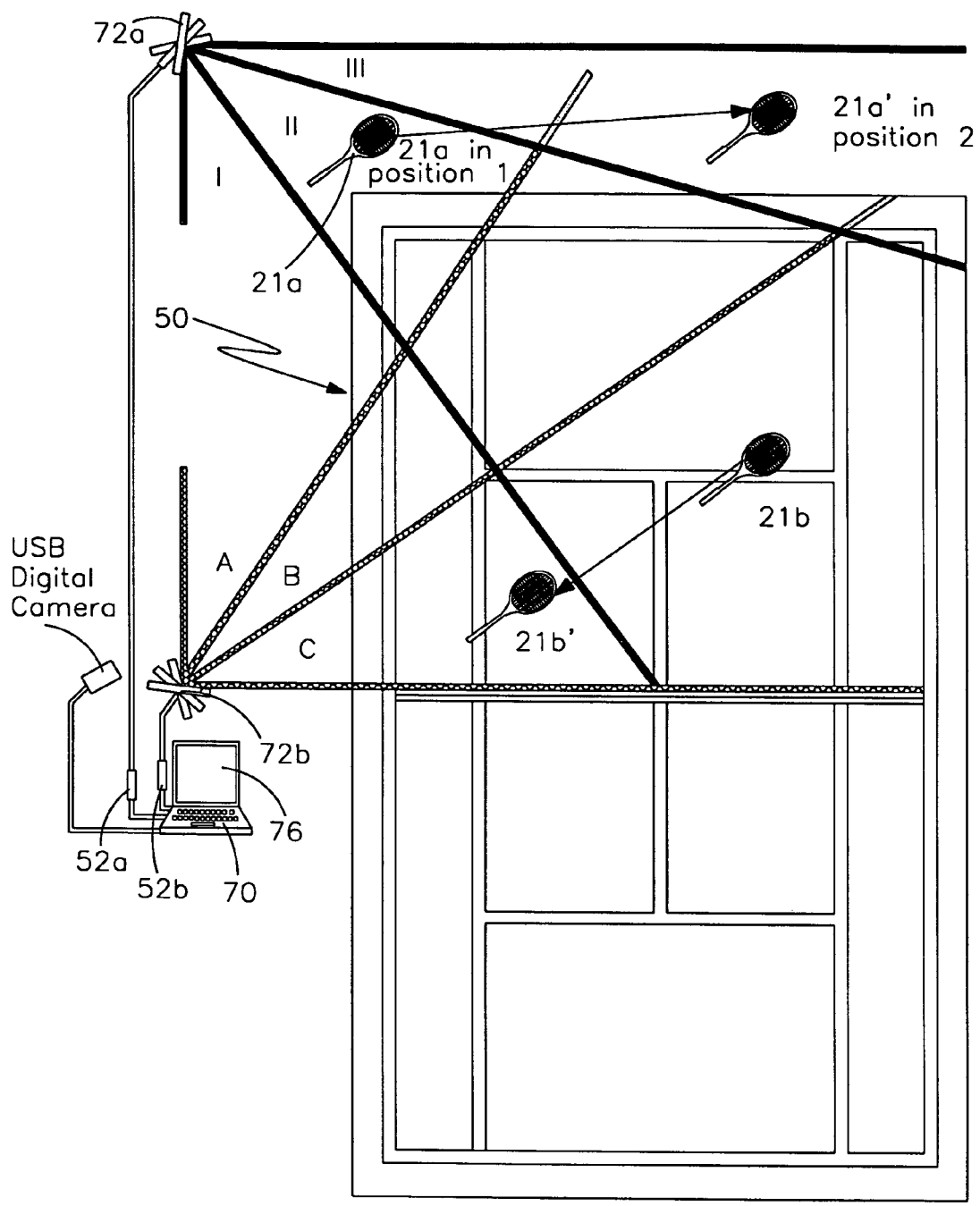
FIG. 4 is a schematic diagram illustrating one embodiment of an external method of measuring position of tennis racquets moving on a tennis court.

The present applicants recognized that one way of measuring position externally takes advantage of a signal transmitted by module 20 mounted on moveable body 21. The signal could be the signal used to transmit orientation of moveable body 21 as calculated by processor 22. It could also be the signal used to transmit the address of moveable body 21. External device 70 could use a technique, such as triangulation using information collected by separated antennas 72a, 72b, as shown in FIG. 4, or a technique using rotating antenna, described herein below. Since base station 52a, 52b is used for controlling module 20 or network 50 of modules 20, external device 70 can be combined with base station 52a, 52b. Three or more separated antennas may be used to improve accuracy and/or to provide location in three dimensions.

In one embodiment this externally determined position information $P_0^F$ is then combined with the inertial position $P_a^F$ information transmitted by moveable body 21. The combining is accomplished in complementary filter 74 which may be located in external device 70, providing an improved measurement of the position $P^F$ of moveable body 21. Typically filter 74 is a digital filter. This improved measurement of position $P^F$ is shown on display 76 updated at each interval of time, along with orientation information determined in module 20 on moveable body 21. This improved measurement of position $P^F$ is then used as the starting point in the next double integration in the next time period as shown by arrow 78 in the flow chart of FIG. 3.

Figure 5A:
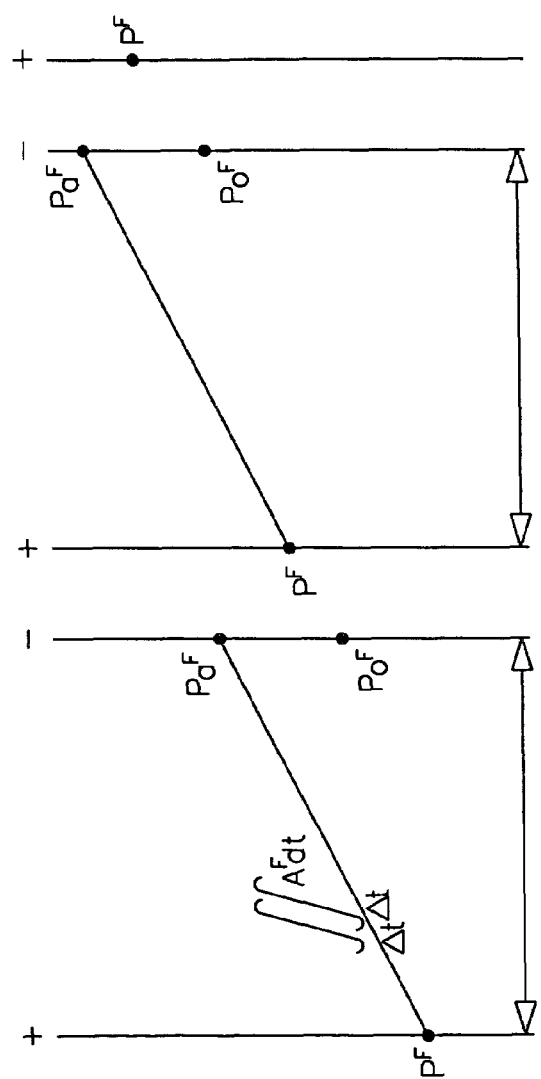
FIG. 5a illustrates the calculation of position as the double integral of the measured acceleration as transformed to a fixed reference frame, the measurement of position from an external position measuring device, and the improved position determination in a complementary filter that provides an averaging of these values.

Complementary filter 74 adjusts the starting point for position for the next time interval with an average that combines the inertial position $P_a^F$ with the externally determined position $P_0^F$, as shown in FIG. 5a, to provide the improved position measurement $P^F$ according to the formula, $$P^F = P_a^F + k(P_0^F - P_a^F)$$

where k is a constant in the range from 0 to 1. k determines the frequency behavior of complementary filter 74. Other algorithms for combining can also be used, such as a Kalman filter in which the value of k is adjusted automatically to provide an optimal result.

Complementary filter 74 can be located in module 20 mounted on moveable body 21. In this case external device/base station 70, 52a, 52b can transmit the actual position information it obtained for computation in processor 22 on moveable body 21. Having transceivers on both module 20 and external device 70, 52a, 52b allows portions of the computations to be accomplished in either location, potentially reducing the load on base station 52a, 52b in a large network.

Figure 3:
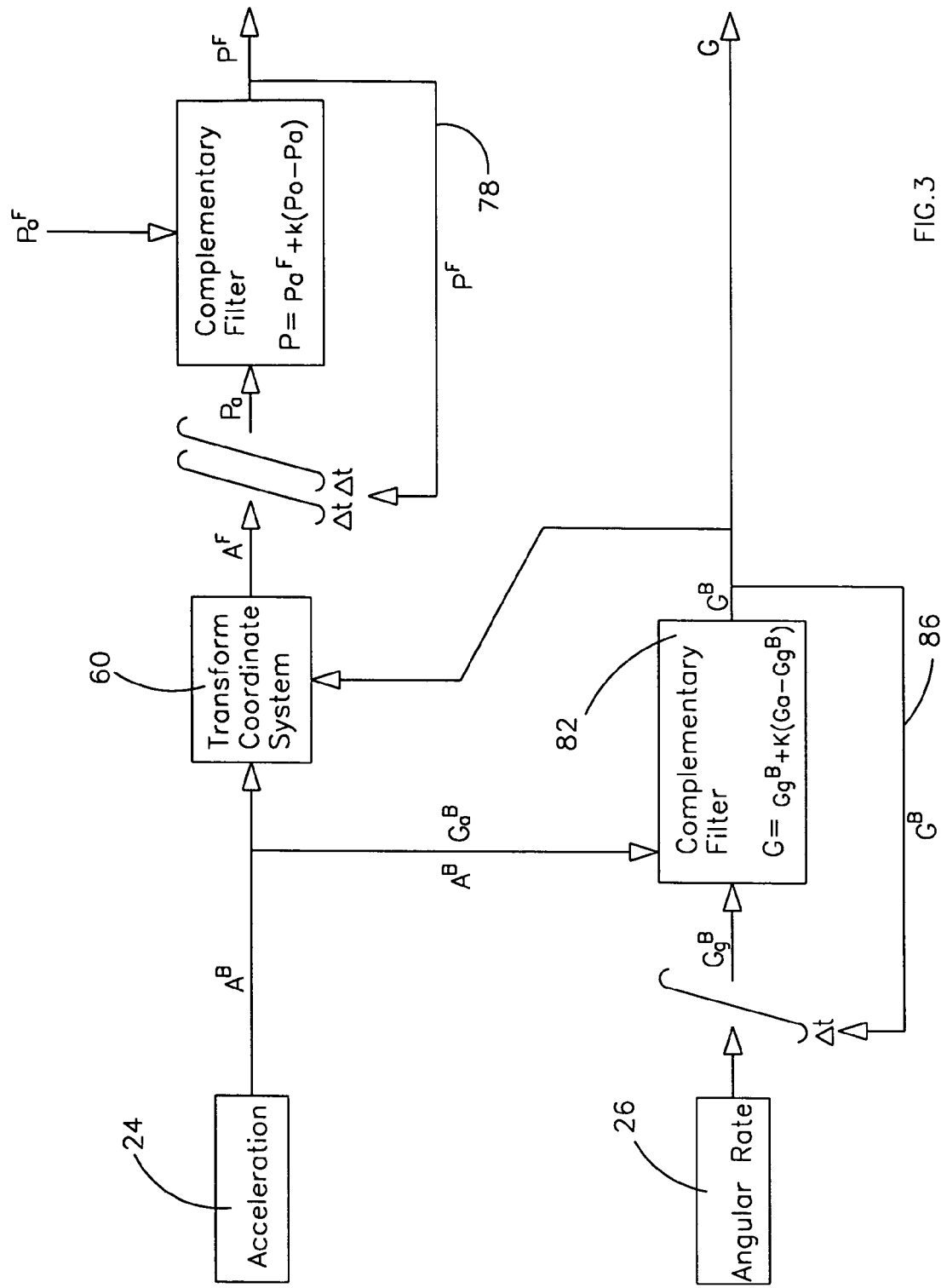
FIG. 3 is a flow chart of the process of determining inertial position and orientation from information provided by the sensors and includes the process of correcting using an external method of measuring position.
Figure 5B:
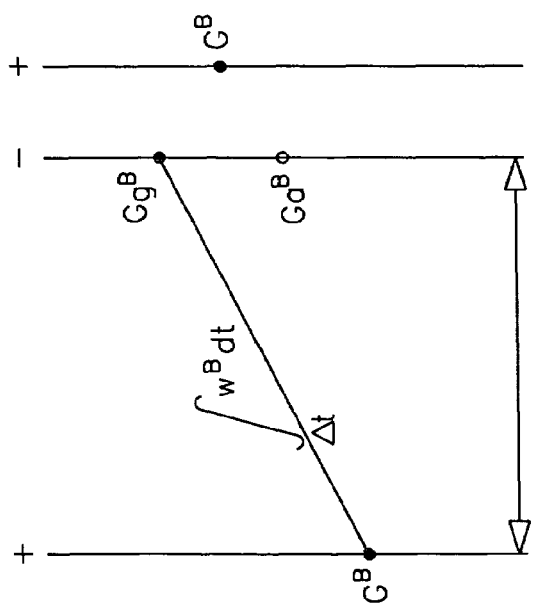
FIG. 5b illustrates the calculation of orientation in the body reference frame as the integral of the measured angular velocity, the determination of orientation in the body reference frame from the accelerometer data, and the improved orientation determination in a complementary filter that provides an averaging of these values.

Similarly, the two inertial measurements of orientation made on module 20, $A^B$ (which is the same as $G_a^B$) from accelerometers 24a-24c and $G_g^B$ from angular rate sensors 26a-26c can be combined in complementary filter 82, as shown in FIGS. 3 and 5b, to provide the improved orientation measurement $G^B$. Typically filter 82 is a digital filter. This improved orientation measurement $G^B$ is shown on display 76 updated at each interval of time, along with the improved position information. This improved measurement of orientation $G^B$ is then used as the starting point in the next integration in the next time period as shown by arrow 86 in the flow chart of FIG. 3. The combination can be according to the formula:

$$G^B = G_g^B + K(G_a^B - G_g^B)$$

where K is a constant. K determines the frequency behavior of complementary filter 74. Other algorithms for combining can also be used, such as a Kalman filter in which the value of k is adjusted automatically to provide an optimal result.

The angular rate sensor measurement of orientation has long term drift which is a low frequency error. The accelerometers provide a good measurement of orientation over a long time duration, or at low frequency, but over short time intervals, or at high frequency, the accelerometer measurement can be very far off. The complementary filter can take the best of both contributions, the high frequency contribution from the angular rate sensors and the low frequency contribution from the accelerometers. This is embodied in the equation immediately above.

The position and orientation inertial calculations calculate a change from an initial starting position and starting orientation. A first step is usually to initialize the system from a known position and orientation. The accelerometers and angular rate sensors tell how much position changed and how much rotation happened since then. Each time interval provides another change from the position and orientation determined in the previous time interval, providing a running tally of position and orientation.

Techniques to externally measure the position of an object using radio transmissions include measuring time of arrival, time difference of arrival, and received signal strength indication (RSSI).

Angle of arrival information can be included to improve accuracy. One way to obtain angle of arrival information is by switching through an array of directional antennas to find the one that delivers the highest signal strength. The resolution for this approach improves by using a larger number of antennas in the array, each with a narrow beam width. For example, using 3 antennas having 30 degrees beam width, as shown in FIG. 4 provides an angle estimate with +/−15 degrees resolution. These antennas are positioned to provide minimum overlap in their lobe of maximum sensitivity to improve resolution.

In the example illustrated in FIG. 4, each instrumented tennis racquet 21a, 21b, is equipped with a rechargeable battery, a frequency agile RF transceiver, MicroStrain's Inertia-link or 3DM-G sensing suite, an omni-directional antenna, signal conditioning, microprocessor, non-volatile memory, optional racquet bending strain gauges 87, and optional internal coil for non-contacting inductive recharging. The circuit for recharging can include a coil and a capacitor. The capacitor can be a tunable capacitor. Multiple racquets 21a, 21b, and/or body segments can be supported by placing each racquet or body segment on a separate RF communications channel.

Strain gauge 87 is positioned for measuring bending moment, for example, on the throat of a tennis racquet or other moveable body. It can also be used to measure time of an impact on the moveable body, duration of an impact on the moveable body, location of an impact on the moveable body, force of an impact on the moveable body, impulse of an impact on the moveable body, and energy of an impact on the moveable body. If the point of impact is known only a single strain gauge is needed to determine the force of impact. A second strain gauge can be connected to the moveable object to determine the force of impact when the location of the impact is not known. Two equations for moment can be used to solve for the force. Two gauges can also be used to cancel temperature effects. If located on opposite sides sensitivity to bending can also be doubled. The two strain gauges provide a single strain gauge channel in a half bridge configuration. A full bridge configuration can be used with four gauges in one strain channel doubling sensitivity again.

The strain gauge can be a static strain gauge or a dynamic strain gauge. The dynamic strain gauge can be a piezoelectric element. The static strain gauge can be a piezoresistive element.

Sectorized array antennas 72a, 72b allow for tracking of the source of the RF transmissions. In the example shown in FIG. 4, two sectorized array antennas 72a, 72b are used to track position (or location) in the horizontal plane of a tennis court. The received radio signal strength intensity (RSSI) will be strongest when each moving racquet 21a, 21a' and 21b, 21b' is located within the sector of that directional antenna which applies to the racquet's location. Triangulation methods between the first and second separated arrays 72a, 72b provides an estimate of location on the tennis court. Note that orientation information is being transmitted by moving racquets 21a, 21a' and 21b, 21b' as they move in space from position 1 to position 2 to base station 52a, 52b, so base station 52a, 52b can refine its estimate of location by processing the orientation data as well.

In this example sectorized antenna arrays 72a, 72b each includes three directional antennas, each with 30 degree RF apertures and each mounted at 30 degree angles with respect to each other. Other numbers of antennas, apertures, and mounting angles can be used. USB base station 52a, 52b collects orientation, racquet strain, and RSSI data from the transmissions from modules 20a, 20b mounted on moving racquet 21a, 21a' and 21b, 21b' and collected by both sets of antenna arrays 72a, 72b. PC 70 collects, records, and displays location, impact, and orientation data. PC 70 may also record streaming video along with these data if equipped with a video camera and image capture software. PC 70 may also re-broadcast position data to remote addressable wireless nodes 20 on racquets 21a, 21a', 21b, 21b' so that each node can record its location data. PC 70 may also broadcast images to a head-up display set (not shown), such as those produced by MicroVision.

Figure 6A:
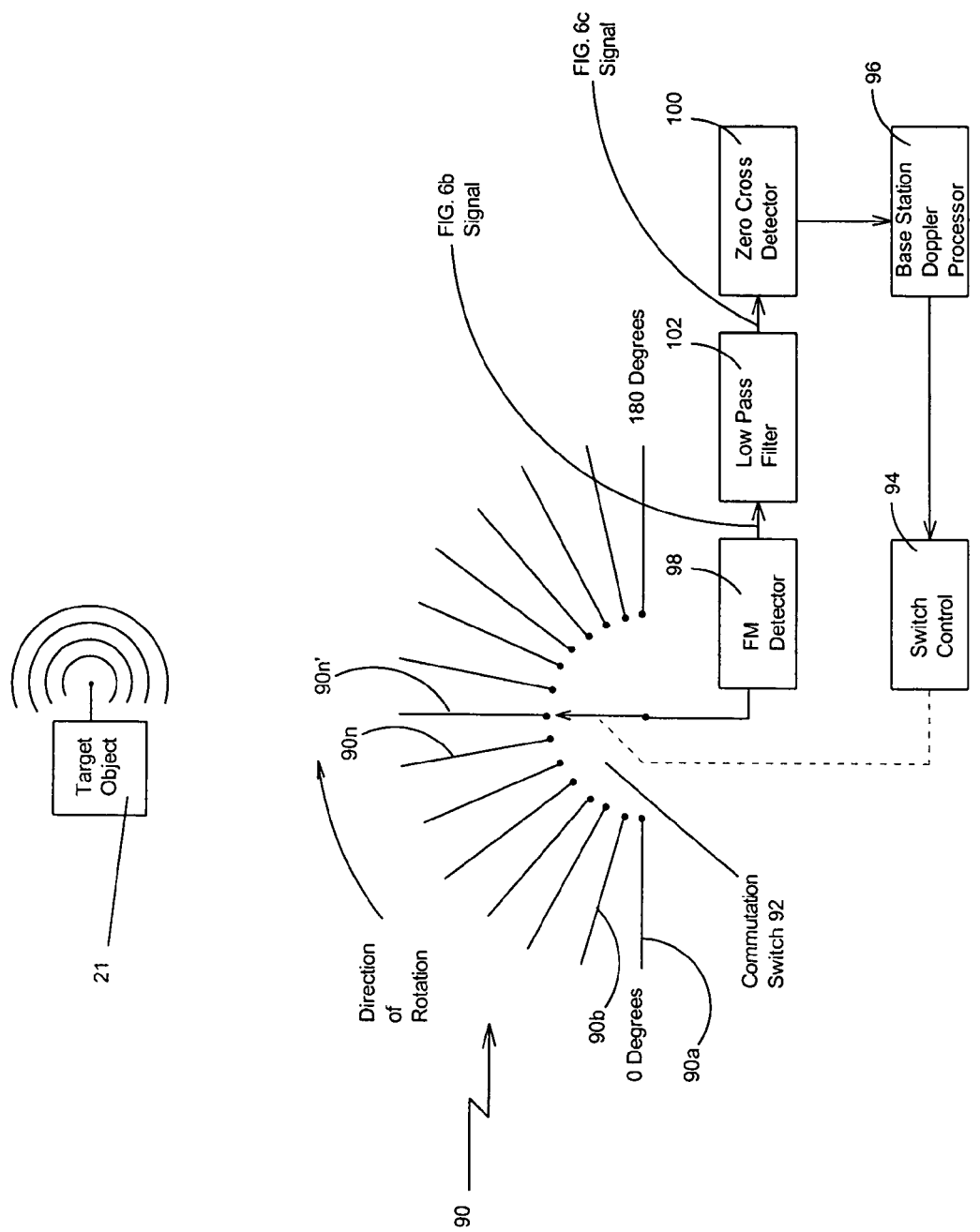
FIG. 6a is a schematic and block diagram of an external device for determining position that uses a commuting antenna array.

In another scheme, angle of arrival accuracy can be further improved by using an antenna rotating at a high rate of speed and detecting Doppler shift of the signal coming from moveable body 21. A single mechanically rotating antenna has practical limits on the rotation rate and limited operating life. Mechanical rotation can be approximated by using an array of antennas 90 oriented as shown in FIG. 6a and electronically switching to each successive antenna 90a, 90b, . . . 90n in sequence using switch 92 controlled by switch control 94 through base station Doppler processor 96 as shown in FIG. 6a. An electronically switched array has the advantage of much higher effective rotation rate relative to a mechanically rotating single antenna. A high rate of effective rotation provides a higher magnitude Doppler effect than motion of moveable body 21 alone would provide.

Figure 6B:
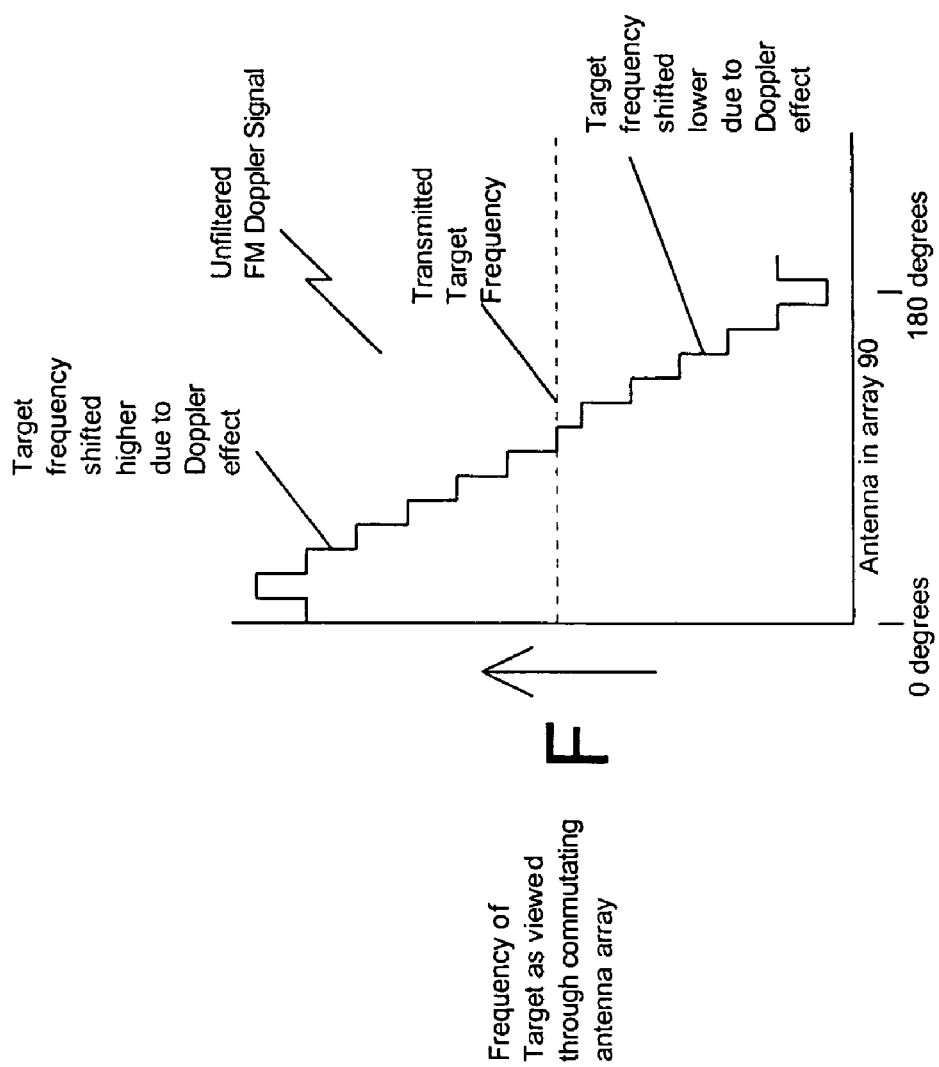

The result of the Doppler effect in a system with commutating antenna array 90 is frequency modulation (FM) on the signal transmitted by moveable body 21 and received by antenna array 90 and processed by FM detector 98, as shown in FIGS. 6a and 6b. The frequency of the received signal is proportional to the velocity of the antenna array 90's virtual movement toward and away from moveable body 21 that is transmitting the signal, as shown in FIG. 6b. When the AC Doppler signal of FIG. 6b is positive, antenna 90n is effectively moving toward moveable body 21, and when negative, antenna 90n is effectively moving away from moveable body 21. Thus, particular antenna 90n' is the one antenna that was aimed at moveable body 21 and its signal corresponds to zero cross of the signal of FIG. 6b. To estimate angle of arrival, zero cross detector 102 outputs a signal to base station Doppler processor 96 to indicate zero cross of this particular AC Doppler signal. This signal is correlated with the direction of antenna 90n' that base station Doppler processor 96 has activated at that instant.

Figure 6C:
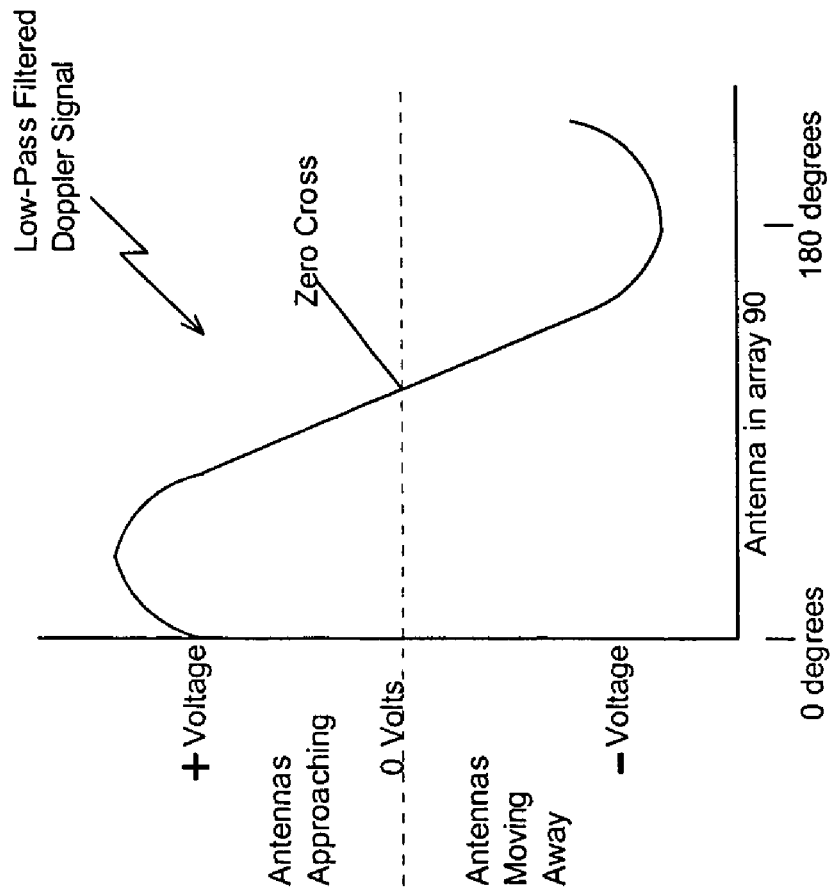
Figure 7A:
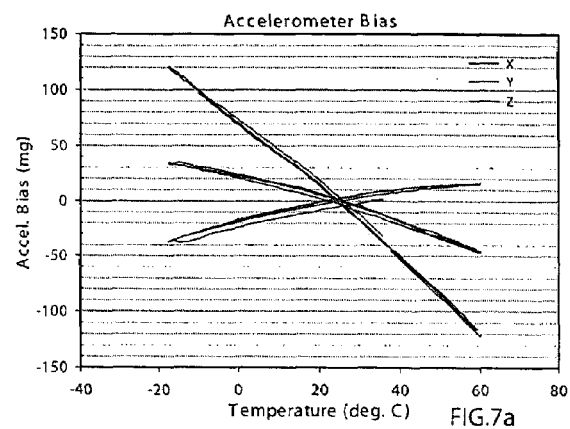
FIG. 7a are accelerometer bias data for x, y, and z accelerometers as temperature varies.
Figure 7B:
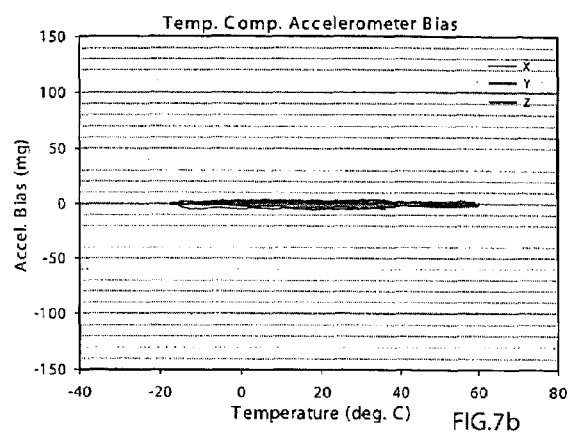
FIG. 7b are temperature compensated accelerometer bias data for x, y, and z accelerometers as temperature varies.
Figure 8A:
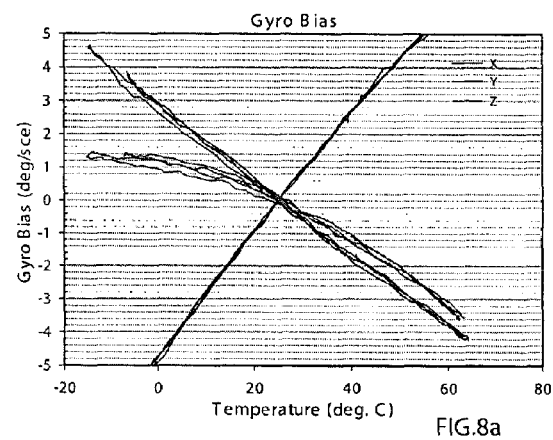
FIG. 8a are angular rate sensor bias data for x, y, and z angular rate sensors as temperature varies.
Figure 8B:
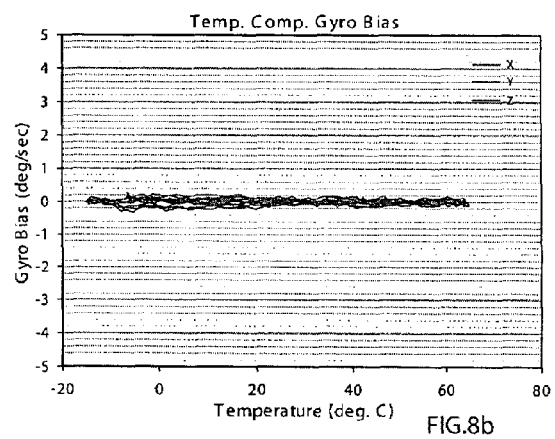
FIG. 8b are temperature compensated angular rate sensor bias data for x, y, and z angular rate sensors as temperature varies.
Figure 9A:
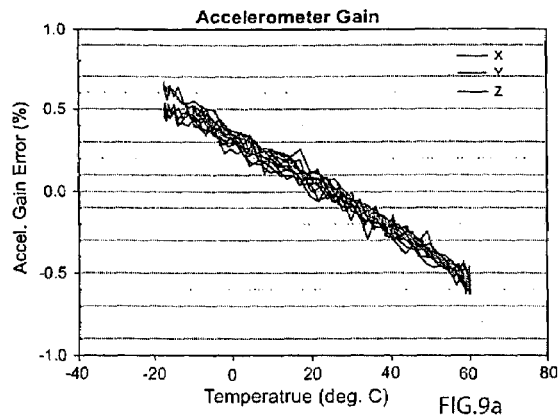
FIG. 9a are accelerometer gain error data for x, y, and z accelerometers as temperature varies.
Figure 9B:
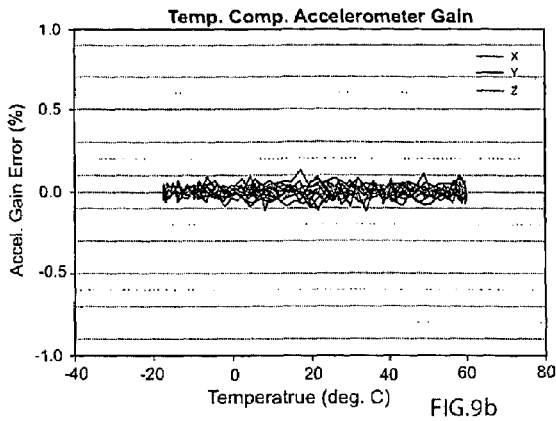
FIG. 9b are temperature compensated accelerometer gain error data for x, y, and z accelerometers as temperature varies.
Figure 10A:
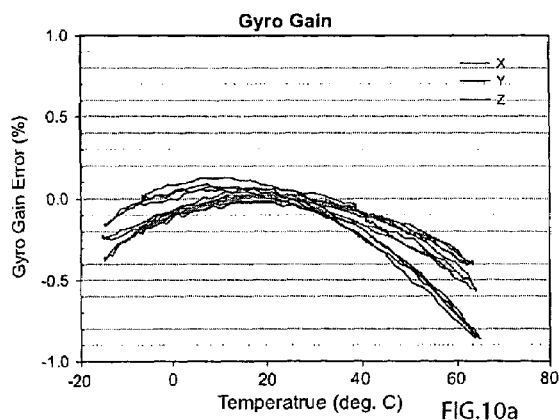
FIG. 10a are angular rate sensor gain error data for x, y, and z angular rate sensors as temperature varies.
Figure 10B:
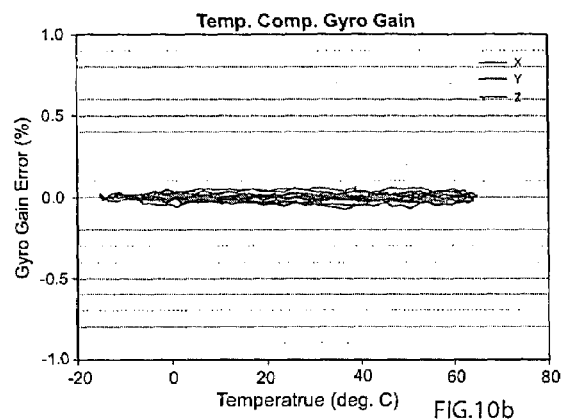
FIG. 10b are temperature compensated angular rate sensor gain error data for x, y, and z angular rate sensors as temperature varies.
Figure 11A:
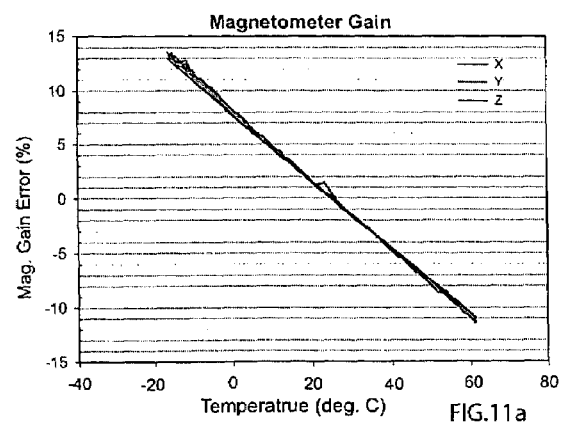
FIG. 11a are magnetometer gain error data for x, y, and z magnetometers as temperature varies.
Figure 11B:
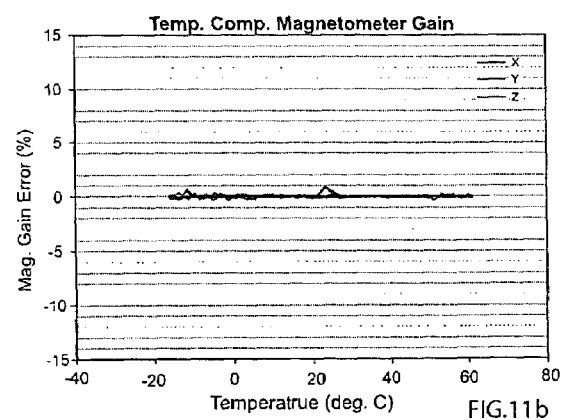
FIG. 11b are temperature compensated magnetometer gain error data for x, y, and z magnetometers as temperature varies.

In this Doppler signal method, directional antennas are not needed. If directional antennas are used, the lobes of maximum sensitivity of the antennas may overlap. The lobes of maximum sensitivity of the antennas may overlap since it is the change in physical distance from the antenna to the object that is providing the information, rather than direction of the antenna. Thus, the array can just include omnidirectional antennas and need not include directional antennas. Low pass filter 102 can be used to filter this DC Doppler signal to smooth the commutation steps and improve the directional accuracy, as shown in FIG. 6c.

The present applicants also found that they could show the orientation and position information in conjunction with video of the moveable body. A display can be provided connected to the system external to moveable body 21 or on moveable body 21, for example to provide biofeedback to a user. Such displays are available from Ntera, Scottsdale, Ariz. A biofeedback mechanism can provide text or images on the display or it can include a device that provides an audible signal, such as a piezoelectric buzzer, visual display, or a vibrator such as an electromagnetic shaker.

In calibrating for temperature the inertial sensors, including 3 accelerometers and 3 angular rate sensors and the 3 magnetic field sensors 104a, 104b, 104c are rotated through Earth's gravity vector and Earth's magnetic field vector at reduced and elevated temperatures. Temperatures are recorded along with digitized outputs from the triaxial accelerometers, magnetometers, and angular rate sensors. A computer based data acquisition system is used for recording this data.

The temperatures are obtained from discrete temperature sensors which are included within each angular rate sensor by the angular rate sensor manufacturer (Analog Devices, Inc.). At various temperatures, the sensors are rotated at a range of angular rates over their intended operating range (from +/−0 to +/−300 degrees per second, or +/−0 to +/−1200 degrees/sec). This allows determination of the relationship between sensor bias drift (offset) and sensor sensitivity (gain) for each of the nine orthogonal sensors at each temperature. Linear and nonlinear correction equations are stored in non-volatile memory and are applied mathematically by the embedded microprocessor to the uncompensated digital sensor signals in order to provide a digital output from the microprocessor that represents the temperature compensated signals from each of the nine sensors, as shown before and after compensation in FIGS. 6a, 6b. Coefficients for coning and sculling error compensation are determined during calibration.

Misalignment from orthogonality of the nine sensors can also be determined and corrected during these spin tests. A correction matrix is burned into non-volatile memory to align the nine sensors mathematically. This matrix is applied to the temperature compensated sensor data to produce an output from the processor that represents temperature compensated, mathematically aligned sensor data from the nine sensors, including the angular rate sensors and magnetometers, as shown before and after compensation in FIGS. 7a, 7b and 8a, 8b.

Other sensors can be used, including GPS 110, and its GPS antenna 112 shown in FIGS. 1a, 1b, and as described in commonly assigned U.S. patent application Ser. No. 11/518,777, and in a paper by Y. Li, A. Dempster, B. Li, J. Wang, and C. Rizos (2005) "A low-cost attitude heading reference system by combination of GPS and magnetometers and MEMS inertial sensors for mobile applications," *The International Symposium on GPS/GNSS* 8-10 Dec. 2005, Hong Kong, paper 5A-01, CD-ROM proceedings.

Figure 12:
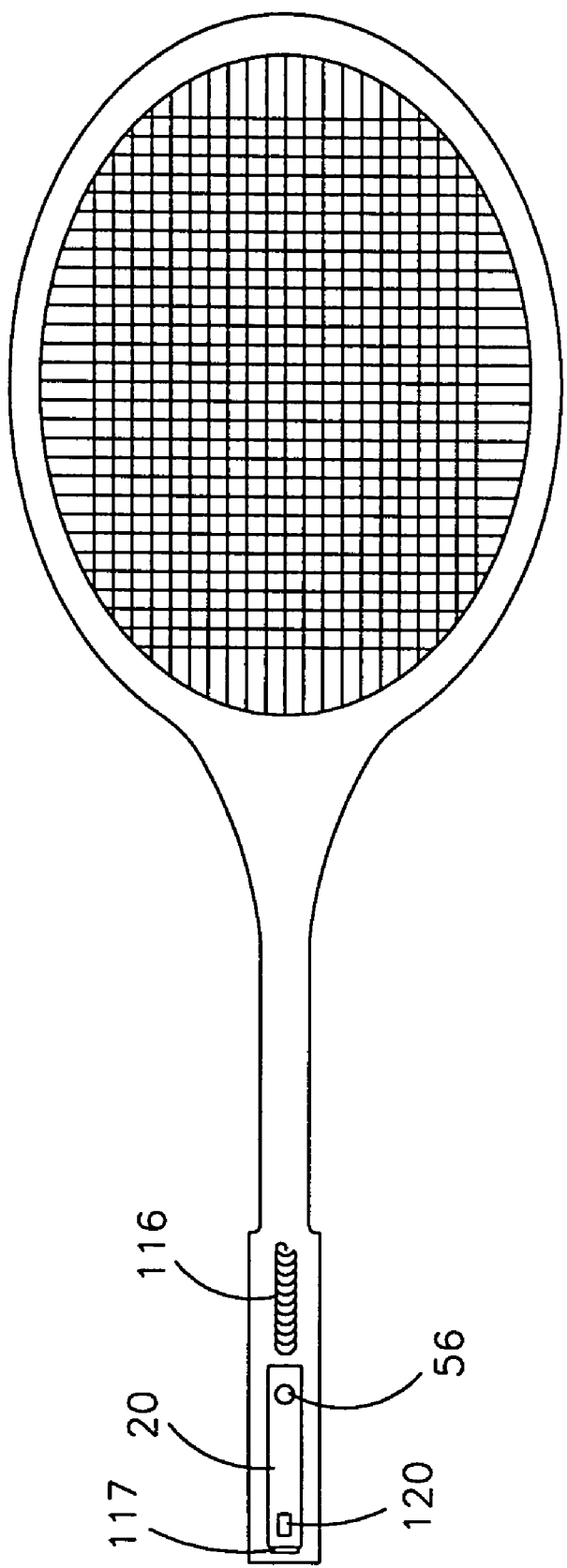
FIG. 12 shows a tennis racquet with a circuit board with electronics located in a hollowed out portion of the handle.

Racquet 21a, 21b can have electronics, including sensors, processor, memory, clock 114, wireless digital transceiver, and rechargeable battery in its hollowed out handle, as shown in FIG. 12. A coil 116 can also be included for inductively recharging the battery. On/off switch 117 can be included as well. An LED indication of battery power and RF transmission can also be provided. Strain sensor 87 can be mounted on the frame of the racquet, as can display 76. Actuator 118 can be provided, such as a piezoelectric transducer, to simulate the impact of a ball on the strings for simulated game play or training. Omni-directional RF antenna 120 can also be mounted within the frame.

In one embodiment, display 76 shows orientation of the racquet at desired points in time, for example, at the moment when the player hits the ball.

UWB gives range to moveable body 21. With this technique triangulation is not needed; a single commuting antenna can be used to provide direction and distance. Triangulation can still be used to improve the determination of position.

While several embodiments, together with modifications thereof, have been described in detail herein and illustrated in the accompanying drawings, it will be evident that various further modifications are possible without departing from the scope of the invention as defined in the appended claims. Nothing in the above specification is intended to limit the invention more narrowly than the appended claims. The examples given are intended only to be illustrative rather than exclusive.

What is claimed is:

1. A system, comprising a moveable body, a first device for mounting on said movable body, an external device, and a display, wherein said first device includes an orientation sensor, an inertial position sensor, a first processor, a first RF transceiver, and a first memory device, wherein said external device and said display are separate from said moveable body, wherein said external device includes a second processor, a second memory device, and a second RF transceiver, wherein at least one from the group consisting of said first memory device and said second memory device includes a program to direct said first RF transceiver to transmit a radio signal that includes at least one from the group consisting of orientation information, inertial position information, and address information to said external device, wherein at least one from the group consisting of said first memory device and said second memory device includes a program for determining a second position measurement of said moveable body from a parameter of said radio signal, wherein at least one from the group consisting of said first memory device and said second memory device includes a program to combine said inertial position information and said second position measurement of said moveable body to provide a combined position measurement of said moveable body for transmission to said display.

2. A system as recited in claim 1, wherein said orientation sensor provides 3-axis orientation.

3. A system as recited in claim 1, wherein said orientation sensor provides 3-axis orientation over 360 degrees.

4. A system as recited in claim 1, wherein said orientation sensor includes a plurality of angular rate sensors and a plurality of accelerometers.

5. A system as recited in claim 4, wherein said orientation sensor includes three orthogonal angular rate sensors and three orthogonal accelerometers.

6. A system as recited in claim 5, wherein said orientation sensor further comprises three orthogonal magnetometers.

7. A system as recited in claim 4, wherein said inertial position sensor includes said plurality of accelerometers.

8. A system as recited in claim 1, further comprising a wired communication port.

9. A system as recited in claim 8, wherein said wired communication port includes at least one from the group consisting of USB, RS-232, RS-485, and CAN bus.

10. A system as recited in claim 1, wherein said RE transceiver includes IEEE 802.15.4.

11. A system as recited in claim 1, wherein said moveable body includes at least one from the group consisting of a camera, an antenna, a drill, a vehicle, an item of sports equipment, a surveying apparatus, a platform, and a living being.

12. A system as recited in claim 11, wherein said item of sports equipment includes at least one from the group consisting of a golf club, a racquet, a bat, a stick, a ball, and a puck.

13. A system as recited in claim 11, wherein said living being includes a person and an animal.

14. A system as recited in claim 11, wherein said vehicle includes at least one from the group consisting of an aircraft, a space vehicle, a ground vehicle, and a marine vehicle.

15. A system as recited in claim 1, further comprising a rechargeable power supply.

16. A system as recited in claim 15, further comprising a non-contacting system for recharging said rechargeable power supply.

17. A system as recited in claim 16, wherein said non-contacting system for recharging said rechargeable power supply includes an energy harvesting system.

18. A system as recited in claim 16, wherein said non-contacting system for recharging said rechargeable power supply includes a coil.

19. A system as recited in claim 18, wherein said non-contacting system for recharging said rechargeable power supply further includes a capacitor.

20. A system as recited in claim 19, wherein said capacitor comprises a tunable capacitor.

21. A system as recited in claim 1, further comprising a digital filter.

22. A system as recited in claim 1, wherein said first memory device includes coefficients for temperature compensation.

23. A system as recited in claim 1, wherein said first memory device includes coefficients for coning and sculling error compensation.

24. A system as recited in claim 1, wherein said first memory device includes coefficients for sensor orthogonality correction.

25. A system as recited in claim 1, further comprising a GPS receiver.

26. A system as recited in claim 1, wherein said first RF transceiver includes an omni-directional antenna.

27. A system as recited in claim 1, wherein said first device includes signal conditioning electronics.

28. A system as recited in claim 1, wherein said first memory device includes non-volatile memory.

29. A system as recited in claim 1, further comprising a strain gauge mounted to said moveable body.

30. A system as recited in claim 29, further comprising a plurality of strain gauges.

31. A system as recited in claim 29, wherein said strain gauge is positioned for measuring at least one from the group consisting of bending moment of said moveable body, time of an impact on said moveable body, duration of an impact on said moveable body, location of an impact on said moveable body, force of an impact on said moveable body, impulse of an impact on said moveable body, and energy of an impact on said moveable body.

32. A system as recited in claim 29, wherein said first processor is capable of combining information from said strain gauge with information from said orientation sensor to determine orientation at time of impact.

33. A system as recited in claim 29, wherein said first processor is capable of combining information from said strain gauge with information from said inertial position sensor to determine position at time of impact.

34. A system as recited in claim 29, wherein said strain gauge includes at least one from the group consisting of a static strain gauge and a dynamic strain gauge.

35. A system as recited in claim 34, wherein said dynamic strain gauge includes a piezoelectric element.

36. A system as recited in claim 1, wherein said orientation sensor includes three orthogonal accelerometers, three orthogonal magnetometers, and three orthogonal rate gyroscopes, wherein said inertial position sensor includes said three orthogonal accelerometers, and further comprising a strain gauge.

37. A system as recited in claim 1, further comprising a housing, wherein said orientation sensor, said inertial position sensor, said first processor, said first RF transceiver, and said first memory device are all within said housing.

38. A system as recited in claim 1, further comprising a feedback mechanism.

39. A system as recited in claim 38, wherein said feedback mechanism includes at least one from the group consisting of a sound producing device and a display.

40. A system as recited in claim 1, further comprising a network of said first devices, wherein each said first device in said network is capable of transmitting information to said external device.

41. A system as recited in claim 40, wherein each said first device in said network further comprises an address.

42. A system as recited in claim 41, wherein each said first device in said network is capable of transmitting and recognizing said address.

43. A system as recited in claim 1, wherein said external device further comprises a digital filter.

44. A system as recited in claim 1, wherein said external device is capable of transmitting a signal to said first device directing said first device to do at least one from the group consisting of enter sleep mode, wake up, start logging data, stop logging data, and transmit data.

45. A method of operating a system, comprising:
 a. providing a moveable body and a first device;
 b. mounting said first device on said moveable body, wherein said first device includes an orientation sensor, an inertial position sensor, a first processor, a first RF transceiver, and a first memory device;
 c. providing an external device and a display, wherein said external device and said display are separate from said moveable body, wherein said external device includes a second processor, a second memory device, and a second RF transceiver;
 d. using said orientation sensor to obtain orientation information;
 e. using said inertial position sensor to obtain inertial position information;

f. transmitting a radio signal including at least one from the group consisting of orientation information, inertial position information, and address information to said external device;

g. determining a second position measurement of said moveable body from a parameter of said radio signal; and h. combining said inertial position information and said second position measurement of said moveable body to provide a combined position measurement of said moveable body for transmission to said display.

46. A system as recited in claim 1, wherein said parameter of said radio signal includes at least one from the group consisting of time of arrival, time difference of arrival, received signal strength indication, Doppler effect, and angle of arrival information.

47. A system as recited in claim 46, wherein said external device includes an antenna arrangement for determining angle of arrival.

48. A system as recited in claim 47, wherein said antenna arrangement includes a plurality of antennas.

49. A system as recited in claim 48, wherein said plurality of antennas includes one from the group consisting of a plurality of separated antennas, a plurality of directional antennas, a plurality of sectorized array antennas, a rotating antenna, and an array of electronically switched antennas.

50. A system as recited in claim 1, wherein at least one from the group consisting of said first RF transceiver and said second RF transceiver includes ultra wide band.

51. A system as recited in claim 1, wherein said first RF transceiver includes a frequency agile transceiver.

52. A system as recited in claim 1, wherein one from the group consisting of said first memory device and said second memory device includes a program to provide said combined position measurement of said movable body for updating position information in said first device.

53. A system as recited in claim 1, further comprising a plurality of said moveable bodies wherein said second transceiver uses addressing.

54. A system as recited in claim 1, wherein said program to combine said inertial position information and said second position information of said moveable body also combines said orientation information and provides a combined position and orientation measurement of said moveable body for transmission to said display.

* * * * *